United States Patent
Kim

(10) Patent No.: US 9,946,303 B2
(45) Date of Patent: Apr. 17, 2018

(54) MOBILE DEVICE AND METHOD FOR OPERATING THE SAME

(71) Applicant: Foundation of Soongsil University-Industry Cooperation, Seoul (KR)

(72) Inventor: Jongseong Kim, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 261 days.

(21) Appl. No.: 14/811,612

(22) Filed: Jul. 28, 2015

(65) Prior Publication Data

US 2016/0041741 A1 Feb. 11, 2016

(30) Foreign Application Priority Data

Aug. 8, 2014 (KR) .................. 10-2014-0102245

(51) Int. Cl.
*G06F 3/00* (2006.01)
*G06F 1/16* (2006.01)
*G06F 9/44* (2018.01)
*G06F 3/14* (2006.01)
*G06F 3/038* (2013.01)
*G06F 3/0484* (2013.01)
*G06F 21/32* (2013.01)

(52) U.S. Cl.
CPC .......... *G06F 1/1647* (2013.01); *G06F 1/1626* (2013.01); *G06F 1/1671* (2013.01); *G06F 1/1686* (2013.01); *G06F 3/038* (2013.01); *G06F 3/0484* (2013.01); *G06F 3/1423* (2013.01); *G06F 9/441* (2013.01); *G06F 21/32* (2013.01)

(58) Field of Classification Search
CPC ............................ G06F 3/04842; G06F 9/441
See application file for complete search history.

(56) References Cited

U.S. PATENT DOCUMENTS

| | | | | |
|---|---|---|---|---|
| 9,053,339 | B2* | 6/2015 | Pate | G06F 21/6218 |
| 2008/0301770 | A1* | 12/2008 | Kinder | H04L 63/0823 726/2 |
| 2009/0125902 | A1* | 5/2009 | Ghosh | G06F 9/45533 718/1 |

(Continued)

FOREIGN PATENT DOCUMENTS

| | | |
|---|---|---|
| KR | 10-2006-0124047 A | 12/2006 |
| KR | 10-2014-0044659 A | 4/2014 |
| KR | 10-2014-0076185 A | 6/2014 |

*Primary Examiner* — Omar Abdul-Ali
(74) *Attorney, Agent, or Firm* — Novick, Kim & Lee, PLLC; Sang Ho Lee

(57) ABSTRACT

Provided herein are a multi smartphone and a method of controlling the same. The multi smartphone includes a display part configured to output a screen when an input signal is sensed; a memory part configured to store a plurality of operating systems (OSs) which are operated differently based on a time at which the input signal is sensed, a place at which the input signal is input, or a user who inputs the input signal; and a control part configured to perform control such that at least one OS of the plurality of OSs is selected and operated based on any one of a time at which the input signal is sensed, the place at which the input signal is input, and the user who inputs the input signal when the input signal is sensed.

8 Claims, 19 Drawing Sheets

(56) References Cited

U.S. PATENT DOCUMENTS

| | | | |
|---|---|---|---|
| 2012/0089980 A1* | 4/2012 | Sharp | G06F 9/45558 718/1 |
| 2012/0204126 A1* | 8/2012 | Yoshimura | G06F 21/53 715/778 |
| 2014/0108506 A1* | 4/2014 | Borzycki | H04L 67/1095 709/203 |

* cited by examiner

MOBILE DEVICE AND METHOD FOR OPERATING THE SAME

CROSS-REFERENCE TO RELATED APPLICATION

This application claims priority to and the benefit of Korean Patent Application No. 10-2014-0102245, filed on Aug. 8, 2014, the disclosure of which is incorporated herein by reference in its entirety.

BACKGROUND

The present invention relates to a multi smartphone and a method of controlling the same, and more particularly, to a multi smartphone configured to select and operate an operating system (OS) based on any one of a time and place at which an input signal is input and user who has input the input signal through a smartphone storing a plurality of OSs and a method of controlling the same.

Generally, a smartphone is a mobile terminal having an Internet connection function, and is excellent in an Internet connection function and a data processing speed, and thus watching moving images and surfing the Internet while moving are possible.

Recently, since various tasks have become possible through smartphones, the number of users performing private tasks as well as other tasks other than private tasks such as business-related tasks using smartphones is increasing.

Also, according to the increase in the number of users performing various tasks using smartphones, the number of users requiring smartphones capable of switching to OSs for performing different tasks corresponding to users' smart usage patterns is increasing.

Thus, a multi smartphone configured to automatically select and operate one OS based on a smartphone usage pattern of a user such as a time or place at which the smartphone is used or a user using the smartphone is required.

SUMMARY OF THE DISCLOSURE

The present invention is directed to providing a multi smartphone configured to select and operate one operating system (OS) of a plurality of OSs based on at least one of a time and place at which an input signal is input and a user who has input the input signal and a method of controlling the same.

According to one aspect of the present invention, there is provided a multi smartphone. The multi smartphone includes a display part configured to output a screen when an input signal is sensed; a memory part configured to store a plurality of OSs which are operated differently based on a time at which the input signal is sensed, a place at which the input signal is input, or a user who inputs the input signal; and a control part configured to perform control such that at least one OS of the plurality of OSs is selected and operated based on one of a time at which the input signal is sensed, the place at which the input signal is input, and the user who inputs the input signal when the input signal is sensed.

When the input signal is sensed, the control part may detect the time at which the input signal is sensed, compare the detected time with OS data classified in the memory part by time, and selects the one OS corresponding to the detected time.

The OS data classified in the memory part by time may have a previously determined driving time or a driving time determined through a user input part.

The control part may detect the place at which the input signal is input, compare the detected place with OS data classified in the memory part by place, and select the one OS corresponding to the detected place.

The control part may detect the user who inputs the input signal, detect whether the user who inputs the input signal is a previously determined user, and select the one OS.

When it is detected whether the user who inputs the input signal is the previously determined user and the one OS is selected, if the user who inputs the input signal is the previously determined user, the one OS may be selected based on the time at which the input signal is sensed or the place at which the input signal is input, and if the user who inputs the input signal is not the previously determined user, an OS stored in the memory part in a guest mode may be selected.

The display part may include one display panel mounted on a front surface of the multi smartphone or one display panel further mounted on a cover case coupled on a side portion of the multi smartphone to include two display panels, or may include one display panel further mounted on a rear surface of the multi smartphone to include two display panels.

According to one aspect of the present invention, there is provided a method of controlling a multi smartphone. The method of controlling the multi smartphone includes, when an input signal is sensed by a user input part mounted on the multi smartphone, detecting a time at which the input signal is sensed, a place at which the input signal is input, or a user who inputs the input signal; selecting one OS among a plurality of previously stored OSs based on the time at which the input signal is sensed, the place at which the input signal is input, or the user who inputs the input signal; and executing the selected one OS on the multi smartphone.

The executing of the selected one OS on the multi smartphone may include, during execution of the one OS selected based on at least one of the time at which the input signal is sensed, the place at which the input signal is input, and the user who inputs the input signal, when at least one of the time at which the input signal is sensed, the place at which the input signal is input, and the user who inputs the input signal changes, switching the selected one OS.

When the time at which the input signal is sensed changes during the execution of the selected one OS, the switching of the selected one OS may include, during the execution of the selected one OS based on the time at which the input signal is sensed, when a previously determined driving time of the selected one OS passes, displaying a notification message inquiring whether to switch to an OS corresponding to a current time, and when a switching request signal is received from the multi smartphone in response to the notification message, switching to the OS corresponding to the current time.

When the place at which the input signal is input changes during the execution of the selected one OS, the switching of the selected one OS may include, during the execution of the selected one OS based on the place at which the input signal is input, when the multi smartphone is out of a previously determined driving place of the selected one OS, displaying a notification message inquiring whether to switch to an OS corresponding to a current place, and when a switching request signal is received from the multi smartphone in response to the notification message, switching to the OS corresponding to the current place.

When the user who inputs the input signal changes during the execution of the selected one OS, the switching of the selected one OS may include, during the execution of the selected one OS based on the user who inputs the input signal, when a current user of the multi smartphone is detected and the current user is different from a predetermined user of the selected one OS, displaying a notification message inquiring whether to switch to an OS corresponding to the current user, and when a switching request signal is received from the multi smartphone in response to the notification message, switching to the OS corresponding to the current user.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
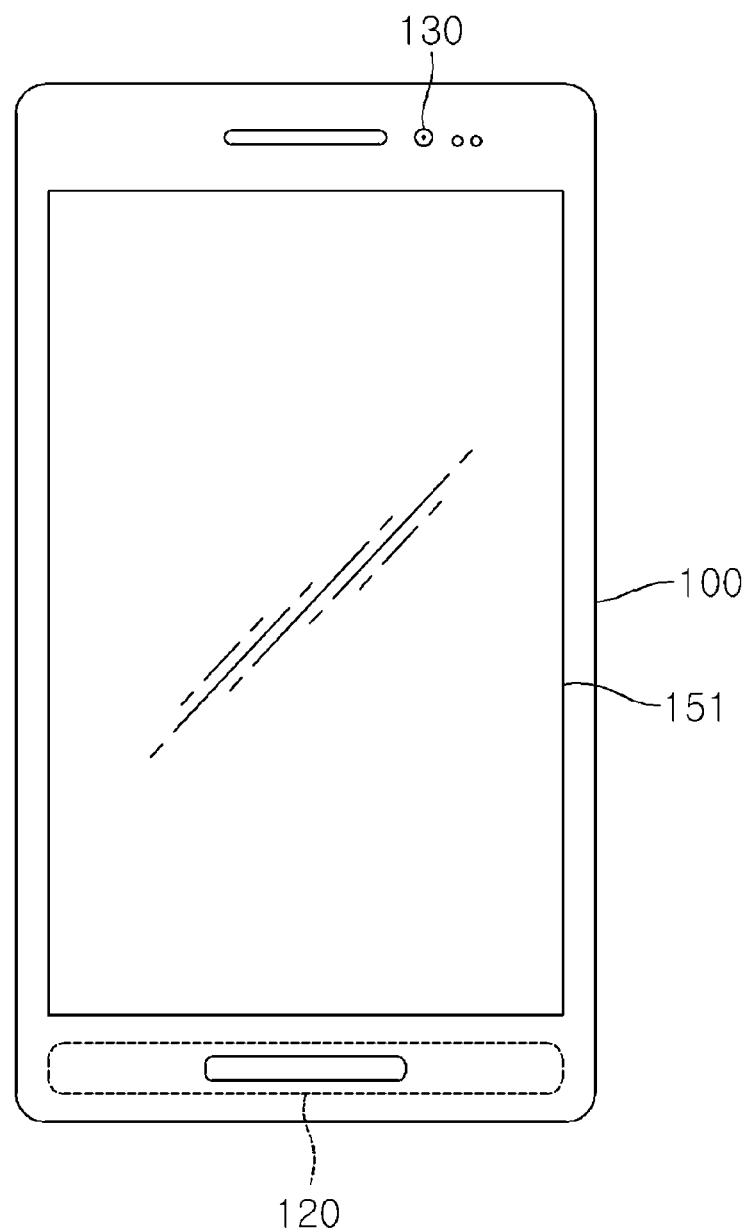
FIG. 1 is a view illustrating a multi smartphone according to an embodiment of the present invention.

In the following description of the present invention, exemplary embodiments of the present invention will be described in detail with reference to the accompanying drawings. Detailed descriptions of well-known functions or constructions will be omitted if they obscure the invention with unnecessary detail. Also, the present invention may be embodied in different forms and should not be construed as limited to the embodiments set forth herein. The exemplary embodiments described herein are provided only so that a person skilled in the art of the present invention can embody the inventive concept of the present invention. Also, the present invention will be embodied in many different forms and is not limited to the embodiments set forth herein. Rather, these embodiments are provided by way of illustration only and so that this disclosure will be thorough, complete and will fully convey the full scope of the invention to those skilled in the art. The present invention is defined only by the appended claims. The same reference numerals refer to like elements throughout the specification.

Hereinafter, preferable embodiments of the present invention will be described in detail with reference to the accompanying drawings.

FIG. 1 is a view illustrating a multi smartphone according to an embodiment of the present invention.

Since a multi smartphone 1 selects and operates an operating system (OS) based on a time or place in which an input signal is input by a user or the user inputting the input signal, the multi smartphone 1 configured to operate a plurality of versions of OSs through which different smartphone tasks can be performed using one smartphone may be realized.

Referring to FIG. 1, the multi smartphone 1 may include a display part 151, a user input part 120, and a camera part 130.

The display part 151 displays and outputs information processed by the multi smartphone 1.

The display part 151 may output a screen displayed under an OS selected according to at least one of a time and place at which the input signal is input by the user and the user inputting the input signal.

When the screen is displayed under the OS selected according to the at least one of the time and place at which the input signal is input by the user and the user inputting the input signal and an OS switching request signal is received, the display part 151 may switch the screen to a screen displayed under a different OS corresponding to the OS switching request signal.

Also, the display part 151 may output a notification message screen configured to display a notification message which inquires whether to switch an OS.

Also, the display part 151 may output a screen displaying a switching request signal input button which may receive an OS switching request signal from the user corresponding to the notification message which inquires whether to switch the OS.

The user input part 120 may sense the input signal used to control an operation of the terminal input by the user.

In order to select the OS based on at least one of the time and place at which the input signal is input by the user and the user inputting the input signal, the user input part 120 according to the embodiment of the present invention may sense the input signal input by the user to output an input sense signal.

The camera part 130 may process an image frame such as a still image or a moving image and/or the like which is obtained by an image sensor in a video call mode or a photography image mode.

The camera part 130 according to the embodiment of the present invention is mounted on a front surface or a rear surface of the multi smartphone 1, and may capture an image from in front of or behind the multi smartphone 1. When the input signal is sensed by the user input part 120, the camera part 130 may operate a camera and capture a face image of the user inputting the input signal.

Also, the camera part 130 may operate in every predetermined period and capture the face image of the user who currently uses the multi smartphone 1.

Figure 2:
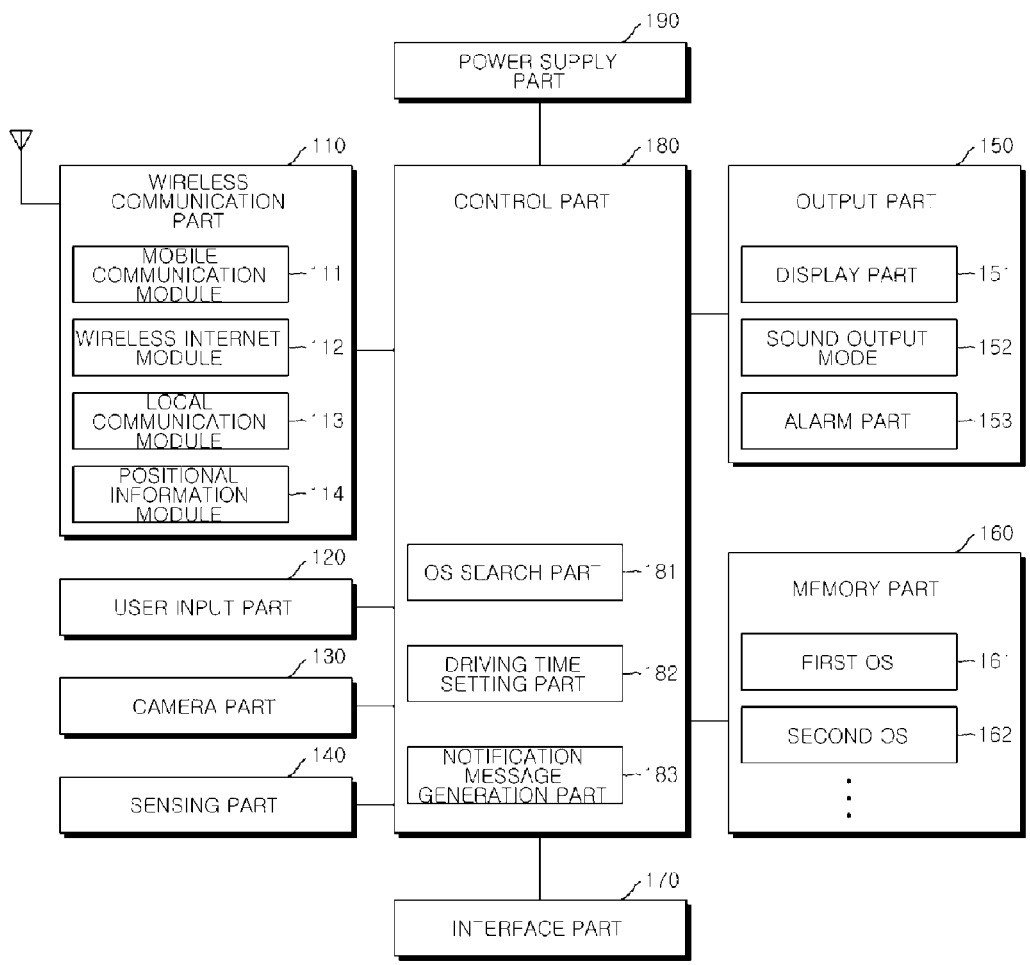
FIG. 2 is a block diagram illustrating control of the multi smartphone of FIG. 1.
Figure 3:
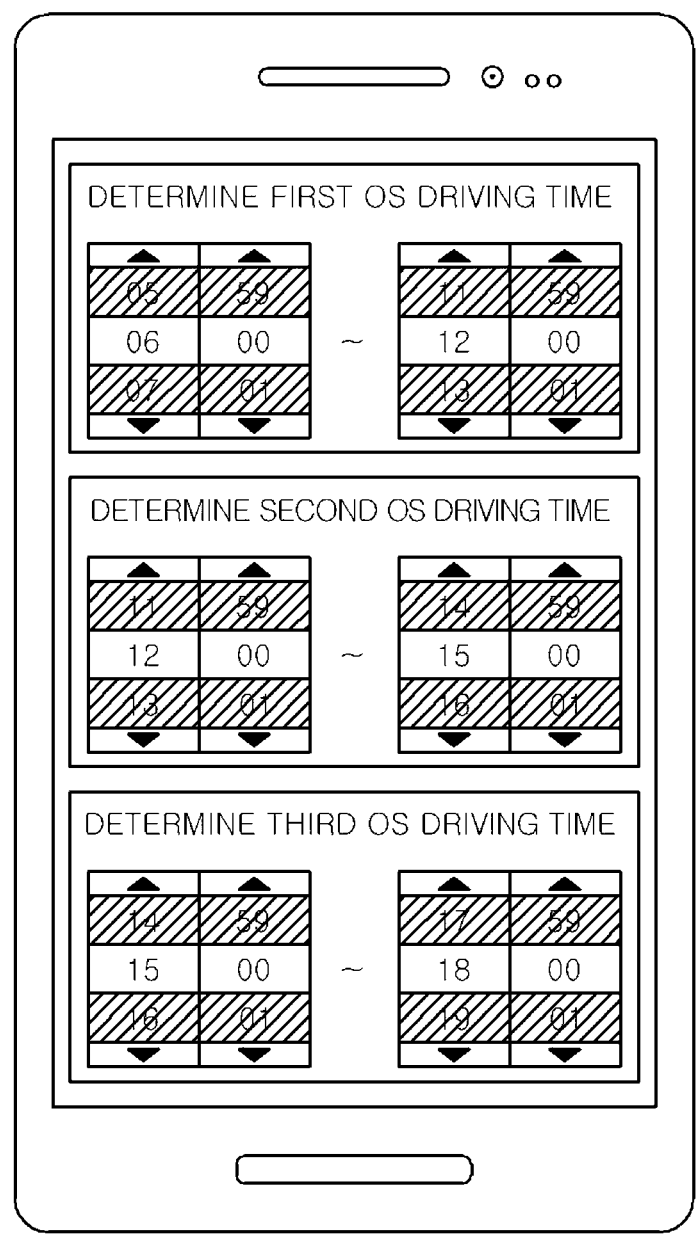
FIG. 3 is a view illustrating an embodiment of a driving time setting part of FIG. 2.

FIG. 2 is a block diagram illustrating control of the multi smartphone of FIG. 1, FIG. 3 is a view illustrating an embodiment of a driving time setting part of FIG. 2, and FIGS. 4A, 4B, and 4C are views illustrating an embodiment of a notification message generation part of FIG. 2.

Referring to FIG. 2, the multi smartphone 1 according to the embodiment of the present invention may include a wireless communication part 110, a user input part 120, a camera part 130, a sensing part 140, an output part 150, a memory part 160, an interface part 170, a control part 180, and a power supply part 190. FIG. 2 shows the multi smartphone 1 having various structural parts. However, described structural parts are not all essential structural parts. The multi smartphone 1 may be realized by more structural parts than the illustrated structural parts, or may be realized by fewer structural parts than the illustrated structural parts. The above-described structural parts will be described below in detail.

The wireless communication part 110 may include one or more structural parts configured to perform wireless communication between the multi smartphone 1 and the outside server.

For example, the wireless communication part 110 may include a mobile communication module 111, a wireless Internet module 112, a local communication module 113, and a positional information module 114.

The mobile communication module 111 transmits and receives wireless signals to and from at least one of a base station, the outside terminal and a server in a wireless communication network. Here, the wireless signal may include data of various types based on a voice signal, a video call signal, or a text/multimedia message transceiver.

The wireless Internet module 112 is a module configured to perform wireless Internet connection. The wireless Internet module 112 may be internal or external.

The local communication module 113 is a module configured to perform local communication. The technology of the local communication may include Bluetooth communication, radio frequency identification (RFID) communication, Infrared Data Association (IrDA) communication, ultra wideband (UWB) communication, Zigbee communication, and/or the like.

The positional information module 114 is a module configured to identify or acquire a position of the multi smartphone 1. For example, the module may include a Global Position System (GPS) module. The GPS module receives positional information from a plurality of satellites. The positional information may include coordinate information displayed as longitude and latitude. For example, the GPS module may measure precise times and distances from three or more satellites and use trigonometry to precisely calculate a current position based on the three different distances. The distance and time information may be acquired by three satellites and one satellite may be used to compensate for an error. In particular, the GPS module may obtain three-dimensional speed information and precise time as well as longitude, latitude, and altitude from the received positional information from the satellites.

The user input part 120 may sense the input signal used to control operation of the terminal which is input by the user. The user input part 120 may include a keypad, a dome switch, a touch pad, a jog wheel, a jog switch, and/or the like. In particular, when the touch pad has a layered structure with the display part 151, the layered structure may be referred to as a touch screen.

The user input part 120 may sense the input signal input by the user, and transmit the sensed input signal to the control part 180 to operate the multi smartphone 1 based on the sensed input signal.

The camera part 130 may be mounted on the front surface or the rear surface of the multi smartphone 1, and capture an image from in front of or behind the multi smartphone 1.

The camera part 130 may photograph the face of the user who is using the multi smartphone 1 and transmit it to the control part 180. Here, the camera part 130 may photograph the face of the user when the input signal is input through the user input part 120 or photograph the face of the user every predetermined period during the operation of the multi smartphone 1.

When the multi smartphone 1 is manufactured in a folder type or a slide phone type, the sensing part 140 may sense whether the multi smartphone 1 is opened or closed, and sense a current state of the multi smartphone 1 such as a position of the multi smartphone 1, a touch of the user, an azimuth of the multi smartphone 1, an acceleration/deceleration of the multi smartphone 1, and/or the like, and generate a generation signal configured to control operations of the multi smartphone 1. Also, the sensing part 140 may perform an operation of sensing a power supply of the power supply part 190, a connection of the interface part 170 to the outside device, and/or the like.

The interface part 170 may interface with all outside devices connected to the multi smartphone 1. For example, the interface part 170 may include a wired/wireless headset port, an outside charge port, a wired/wireless data port, a memory card port, a port connected to a device having an identification module, an audio input/output (I/O) port, a video I/O port, an earphone port, and/or the like.

Here, the identification module may include a user identification module, a subscriber identification module, a general user identification module, and/or the like as a chip configured to store a variety of information for identifying authority of a user of the multi smartphone 1. The device having the identification module may be manufactured in a smart card type.

The memory part 160 may store a program configured to process and control the control part 180, and perform an operation of temporarily storing input/output data.

The above memory part 160 may store a plurality of OSs, and one or more software module may be recorded thereon. The memory part 160 may include a NAND based flash memory. Also, the memory part 160 may include memories of various capacities such as a CF memory, an SD memory, a mini SD memory, an XD memory, a memory stick, a memory stick duo, an SMC memory, an MMC memory, an RS-MMC memory, and/or the like, and may include a hard disk which is used in a general PC or a notebook.

The plurality of OSs stored in the memory part 160 are OSs configured to operate various software modules of the multi smartphone 1, and each of the various kinds of OSs may be stored.

The OSs stored in the memory part 160 may include Symbian OS, Windows Mobile OS, iPhone IOS, Android, Palm OS, Blackberry OS, and/or the like.

The control part 180 may control overall operations of the multi smartphone 1. For example, control and process related to a voice call, data communication, a video call, and/or the like may be performed.

The above control part 180 may search for an OS based on at least one of the time and place at which the input signal is input and the user inputting the input signal, and control series of processes of executing the located OS on the multi smartphone 1.

The control part 180 may include an OS search part 181, a driving time setting part 182, and a notification message generation part 183.

The OS search part 181 may search for and operate the OS based on at least one of the time and place at which the input signal is input and the user inputting the input signal.

In particular, the OS search part 181 may detect the time at which the input signal is input and search for the OS in which a driving time is set as a time corresponding to the detected time from the memory part 160. Here, a plurality of OSs may be classified by time in the memory part 160.

Meanwhile, in the OSs classified by time in the memory part 160, the time may be previously set, or as described in FIG. 3, a driving time may be set by the driving time setting part 182 in every OS.

Also, the OS search part 181 may search for an OS based on the place at which the input signal is input.

In particular, when the input signal is sensed, the OS search part 181 may detect the place at which the input signal is input through the positional information module 114, and search for the OS corresponding to the detected place from the memory part 160. Here, a plurality of OSs may be classified by place in the memory part 160.

For example, when the input signal is sensed and the detected place of the multi smartphone 1 is inside an office building, the OS search part 181 may search for an OS set in an office mode, and when the input signal is sensed and the detected place is outside of the office building, the OS search part 181 may search for an OS set in a private mode.

Also, when the input signal is input, the OS search part 181 may operate the camera part 130 and control it to photograph the face of the user who inputs the input signal. The OS search part 181 may receive the captured face image of the user, compare the received face image with a face image previously stored in the memory part 160, and search for the OS.

In particular, the OS search part 181 may compare the captured face image of the user with the face image previously stored in the memory part 160 and detect whether the user who inputs the input signal is the previously determined user. The OS search part 181 may compare the captured face image of the user with the face image previously stored in the memory part 160, and when the user who inputs the input signal is determined to be the previously determined user, the OS search part 181 may search for the OS based on the time or place at which the input signal is input. Also, the OS search part 181 may compare the captured face image of the user with the face image previously stored in the memory part 160, and when the user who inputs the input signal is not determined to be the previously determined user, the OS search part 181 may search for the OS stored in a guest mode.

Meanwhile, the detection of whether the user who inputs the input signal is the predetermined user by comparing the captured face image with the previously stored face image may be performed using an Adaboost learning classifier. A method of detecting whether the user who inputs the input signal is the previously determined user using the Adaboost learning classifier is well known in the related art, and thus detailed description will be omitted. Also, the method of detecting whether the user who inputs the input signal is the previously determined user by comparing the captured face image with the previously stored face image is not limited to the Adaboost learning classifier, but it should be understood that methods other than the above-described method may be applied as long as they are methods through which it can be detected whether the user is the predetermined user by comparing the captured image and the previously stored image.

When at least one of the time and place at which the input signal is input and the user who inputs the input signal changes while the notification message generation part 183 operates the OS located based on at least one of the time and place at which the input signal is input and the user who inputs the input signal, the notification message generation part 183 may control an OS switching notification message inquiring whether to switch to an OS located based on the changed at least one of the time, place, and user to be generated and output the OS switching notification message through the alarm part 153.

Figure 4A:
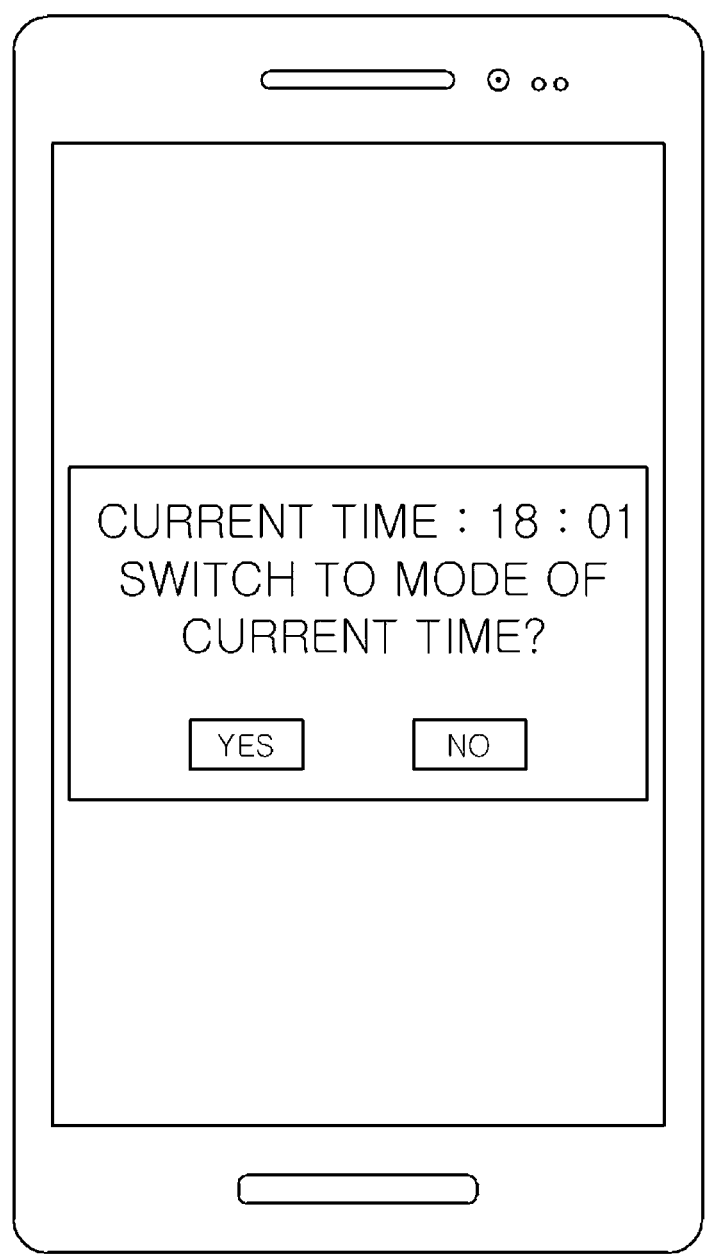
FIGS. 4A, 4B, and 4C are views illustrating an embodiment of a notification message generation part of FIG. 2.
Figure 4B:
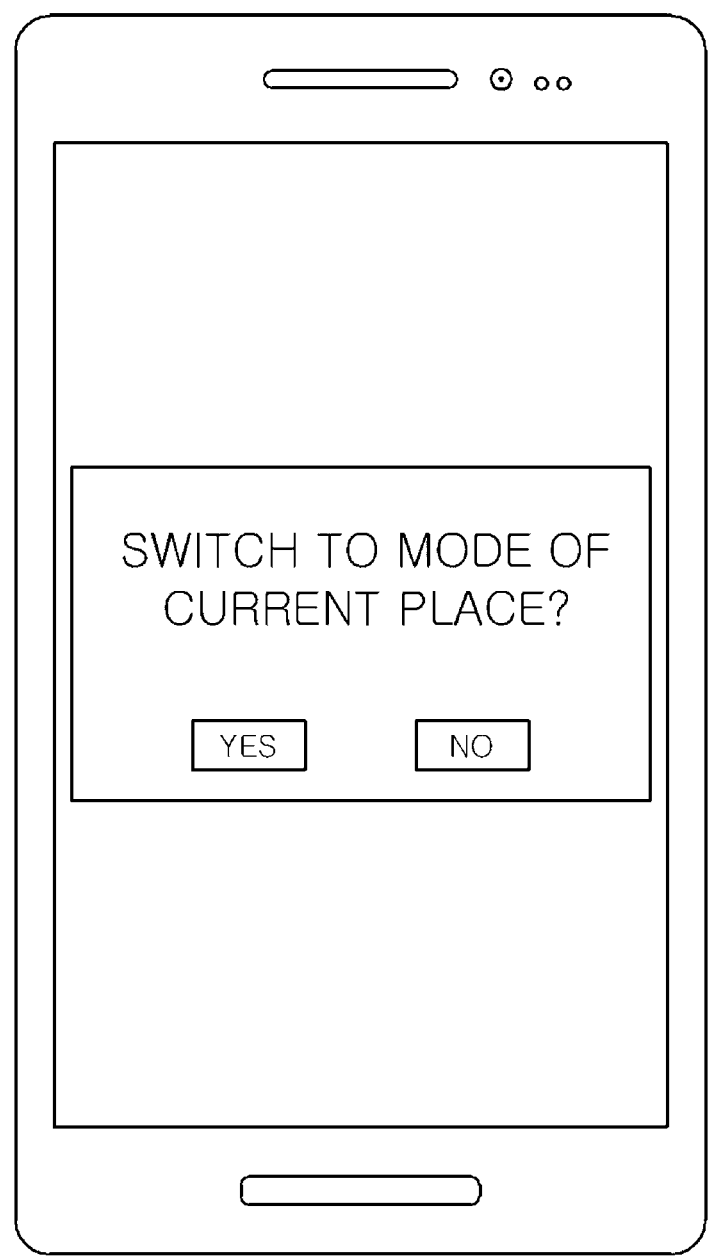
Figure 4C:
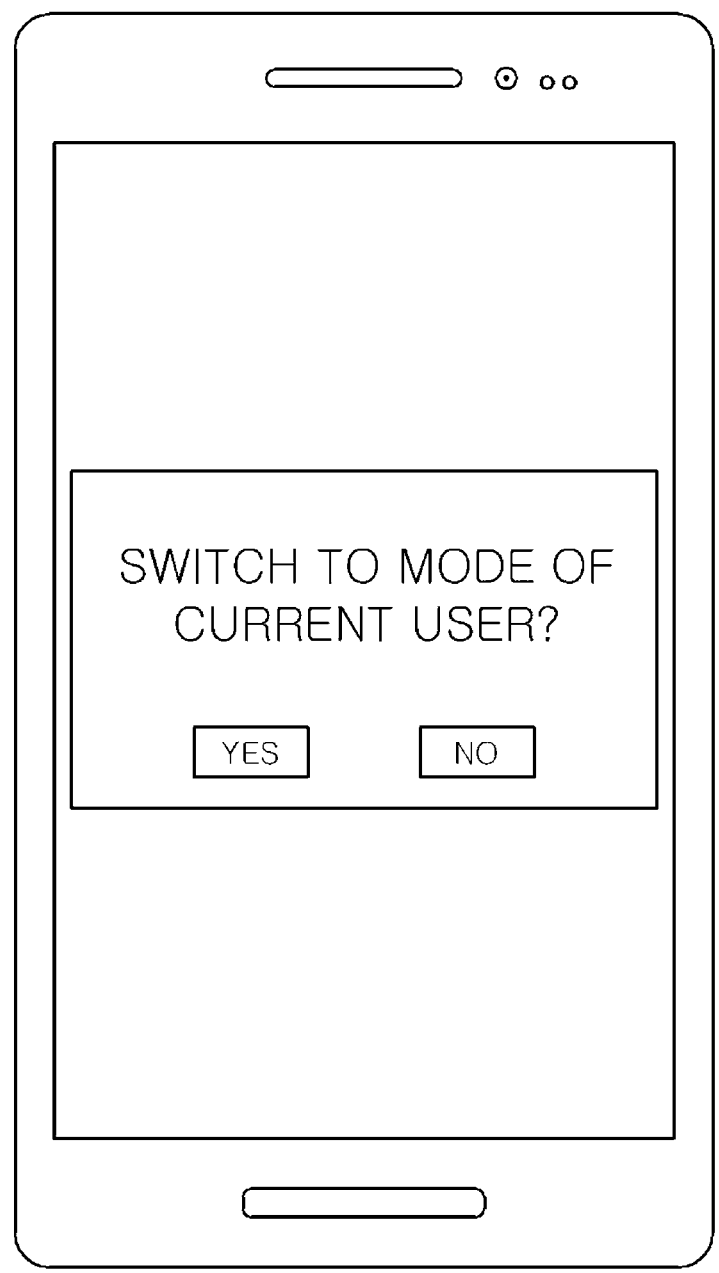

For example, referring to FIG. 4A, when an operating time of an OS which is currently operated in the multi smartphone 1 is set as 09:00 to 18:00 and a current time is 18:01, which is past 18:00, the notification message generation part 183 may control a notification message such as "Switch to mode of current time?" to be generated and output through the alarm part 153.

Also, when the multi smartphone 1 is outside of a previously determined driving place in which an OS is currently operated in the multi smartphone 1 and transported to another place, the notification message generation part 183 may control a notification message inquiring whether to switch to the OS corresponding to the transported place to be generated and output through the alarm part 153.

Also, the notification message generation part 183 may compare the face image received by the camera part 130 with the face image previously stored in the OS which is currently operated and detect whether the user currently using the multi smartphone 1 is the previously determined user of the OS which is currently operated. As described in FIG. 4C, when the user who is currently using the multi smartphone 1 is not the previously determined user of the OS which is currently operated, the notification message generation part 183 may control a notification message inquiring whether to switch to the OS corresponding to the user currently photographed by the camera part 130 to be generated and output through the alarm part 153.

When the switching request signal is received in response to the output notification message, the control part 180 may search for and operate an OS corresponding to the changed time, place, or user.

The output part 150 is configured to output an audio signal, a video signal, or an alarm signal, and may include the display part 151, the sound output module 152, the alarm part 153, and/or the like.

The display part 151 may display and output information processed by the multi smartphone 1.

The display part 151 may output a screen of one OS selected according to at least one of the time and place at which the input signal is input through the user input part 120 and the user who inputs the input signal.

Also, the display part 151 may output a notification message window which displays a notification inquiring whether to switch the OS, and display a key ("Yes," "No") used to receive an input of an OS switching request signal from the user corresponding to the notification message which inquires whether to switch the OS.

Also, when the OS switching request signal is received while a screen displayed under the OS selected according to at least one of the time and place at which the input signal is input by the user and the user who inputs the input signal, the display part 151 may output a screen displayed under another OS from which the OS is switched in response to the OS switching request signal.

As described above, when the display part 151 and the touch pad form a layered structure to form a touch screen, the display part 151 may be used as an input device as well as the output device. The display part 151 may include at least one of a liquid crystal display, a thin film transistor liquid crystal display, an organic light emitting diode, a flexible display, and a three-dimensional display.

According to another embodiment of the present invention, the display part 151 may include two display panels.

Figure 5A:
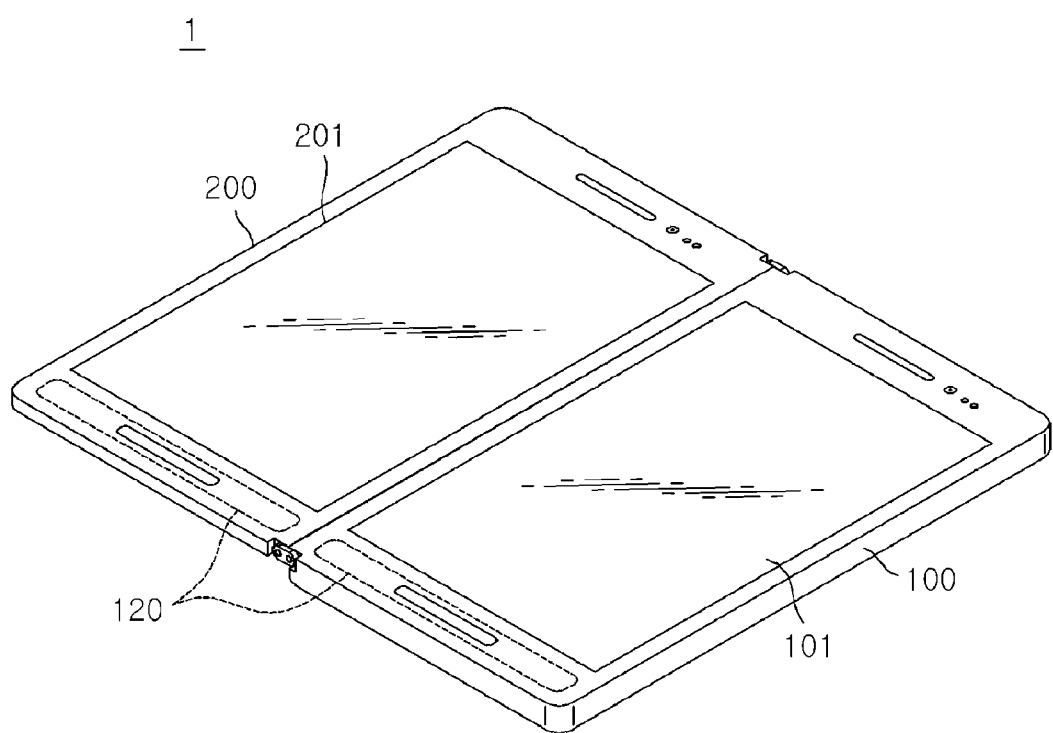
FIGS. 5A, 5B, and 5C are views illustrating a display part according to another embodiment of the present invention.
Figure 5B:
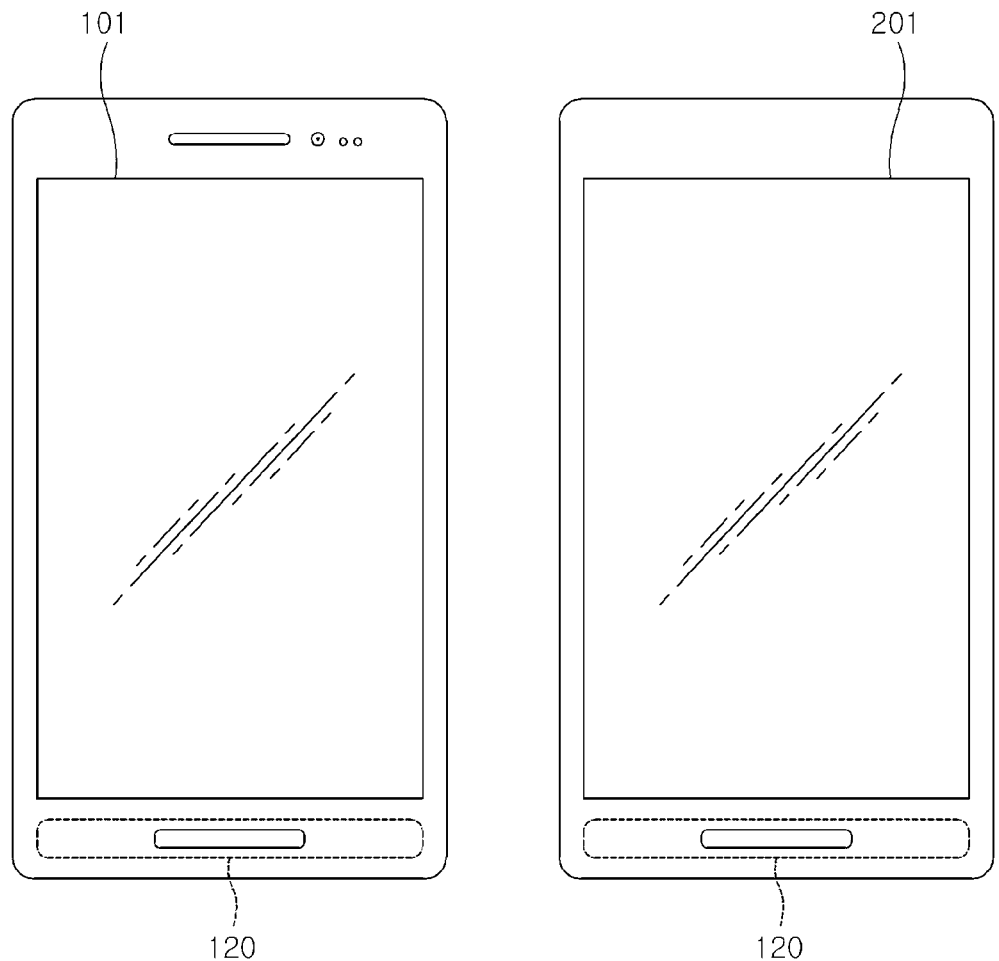
Figure 5C:
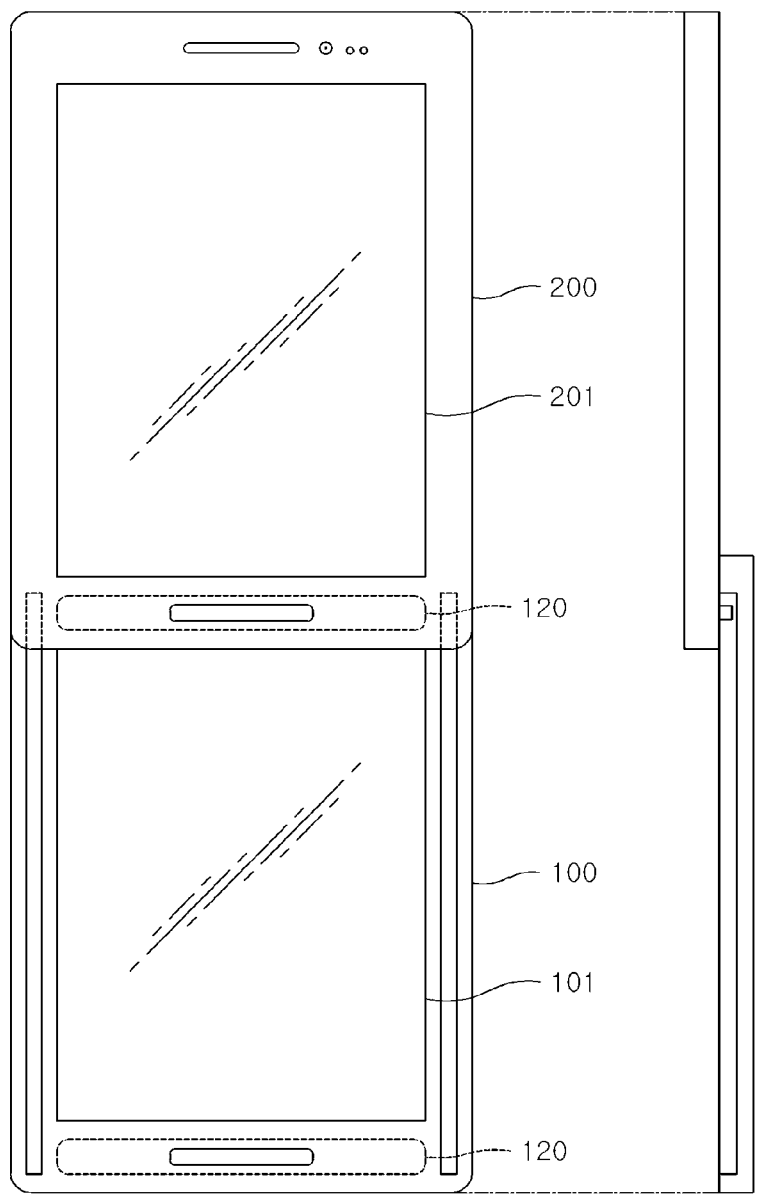
Figure 6A:
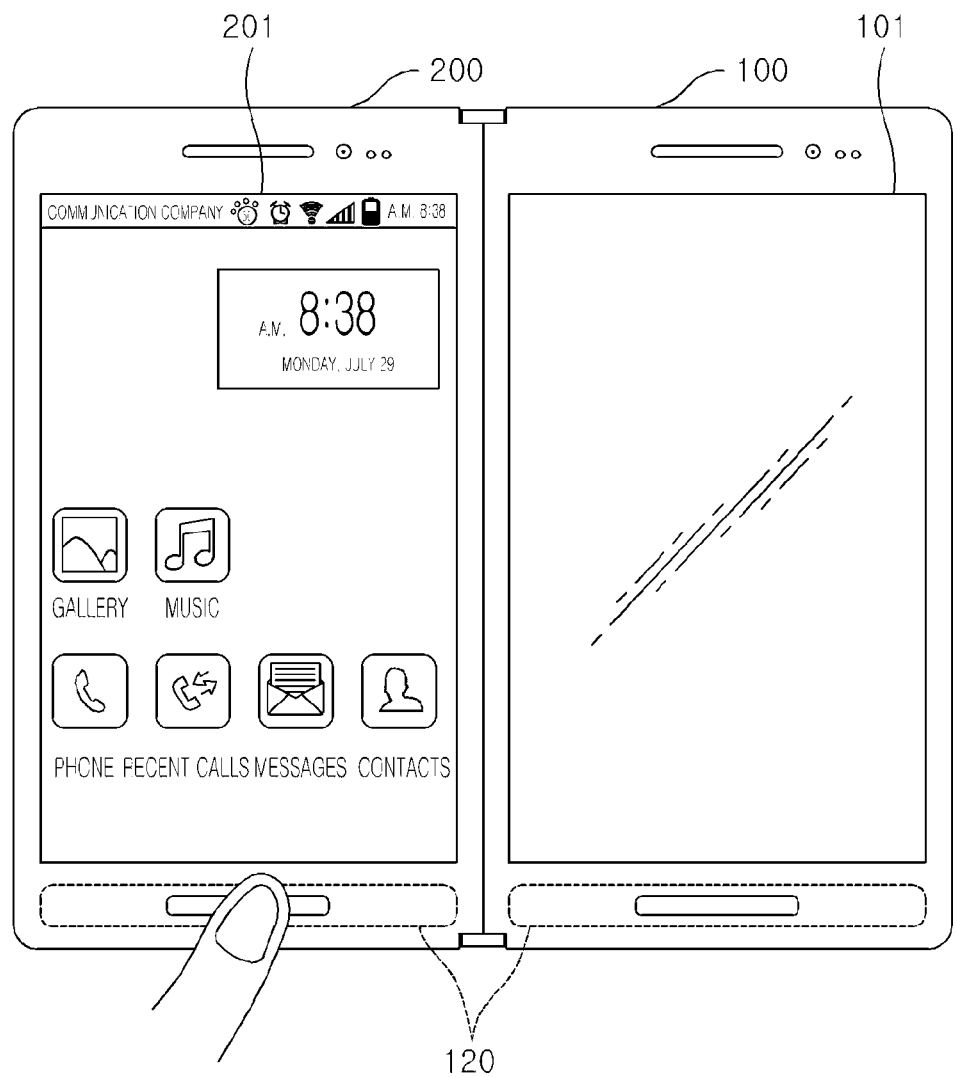
FIGS. 6A and 6B are views illustrating an operation method of a display part according to another embodiment of the present invention.
Figure 6B:
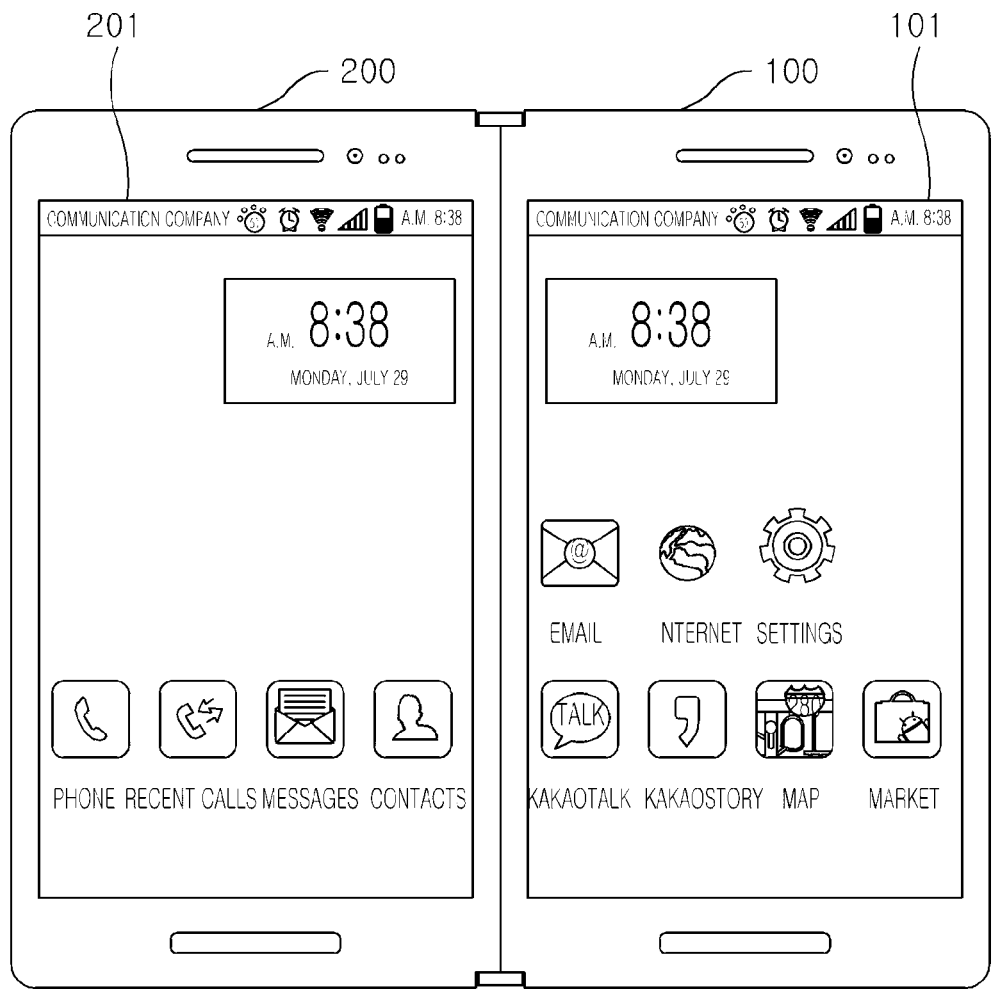

FIGS. 5A, 5B, and 5C are views illustrating a display part according to another embodiment of the present invention, and FIGS. 6A and 6B are views illustrating an operation method of a display part according to another embodiment of the present invention.

The display part 151, as described in FIG. 5A, may include a first display panel 101 mounted on a first device 100 of the multi smartphone 1 and a second display panel 201 mounted on a second device 200 mounted on a side portion of the first device 100, and thus include two display panels. Also, the display part 151, as described in FIG. 5B, may include a first display panel 101 and a second display panel 201 respectively mounted on a front surface and a rear surface of a first device of the multi smartphone 1, and thus include two display panels. Also, the display part 151, as described in FIG. 5C, may include a first device 100 and a second device 200 which are in a sliding combination, and include a first display panel 101 and a second display panel 201 respectively mounted on the first device 100 and the second device 200, and thus include two display panels.

Also, when the input signal is input by the user, the display part 151 including the two display panels 101 and 201 may output a screen on a display panel in which the input signal is input, and as described in FIG. 6B, screens of different OSs may be output on two display panels 101 and 201.

Figure 7A:
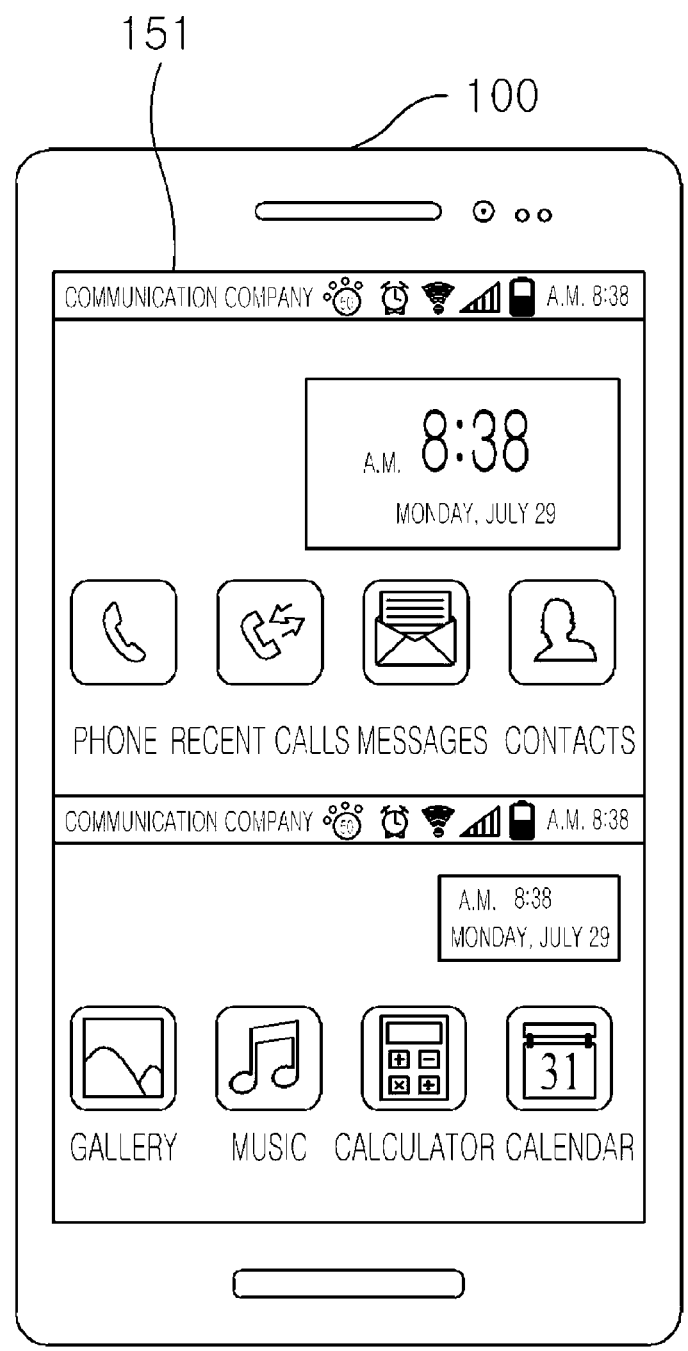
FIGS. 7A and 7B are views illustrating an operation method of a display part according to still another embodiment of the present invention.
Figure 7B:
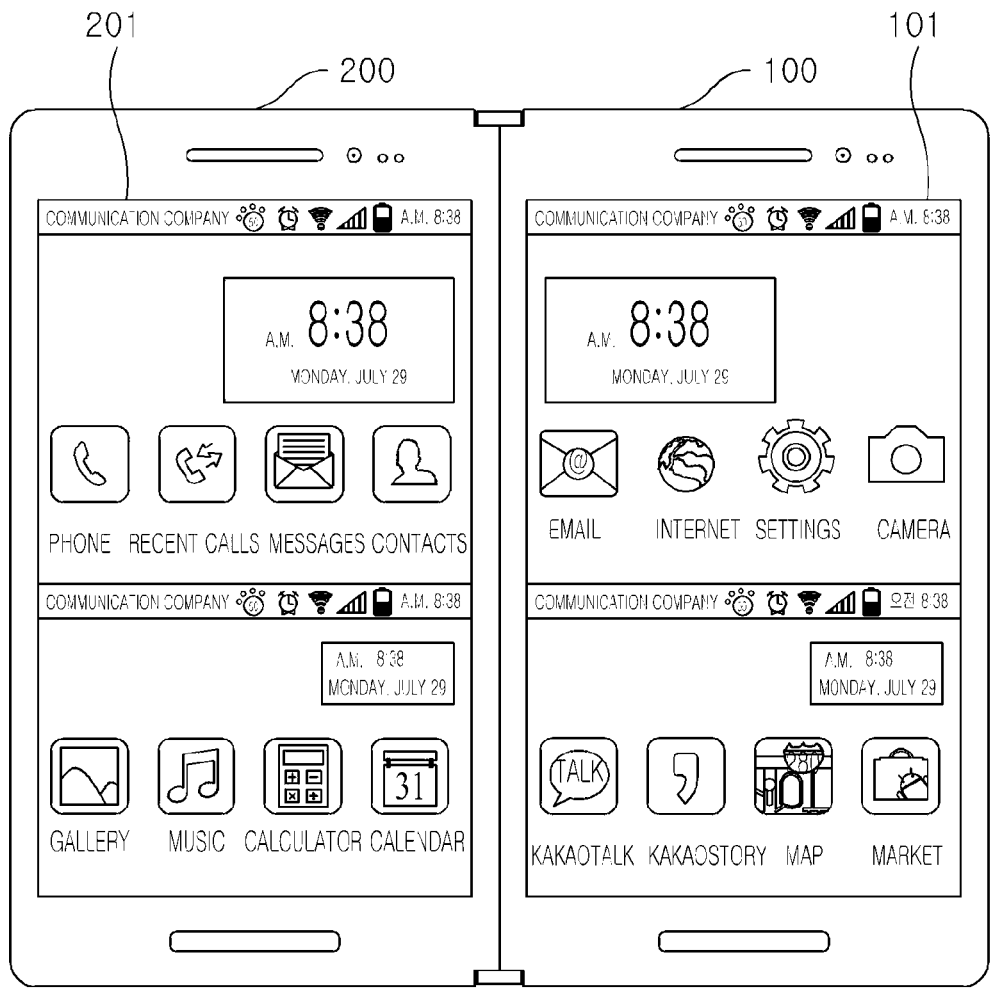

FIGS. 7A and 7B are views illustrating an operation method of a display part according to still another embodiment of the present invention.

According to still another embodiment of the present invention, as described in FIG. 7A, a screen output on a display part 151 may be divided into two screens, and a multi smartphone 1 which operates different OSs on the divided screens and functions as two smartphones may be realized. Here, the display part 151 may include two display panels 101 and 201 as described above, and as described in FIG. 7B, screens output on the two display panels 101 and 201 may be divided into two screens. Different OSs may be applied to the two display panels 101 and 201 having divided screens, and thus functions of four smartphones may be realized.

The sound output module 152 outputs audio data receives from a wireless communication part 110 or stored in a memory part 160 in a signal receiving mode, a call mode, a recording mode, a speech recognition mode, a content receiving mode, and/or the like. Also, the sound output module 152 outputs a sound signal related to functions performed by the multi smartphone 1. The sound output module 152 may include a speaker, a buzzer, and/or the like.

The alarm part 153 outputs a signal used to notify of an event occurring in the multi smartphone 1. Examples of the event occurring in the multi smartphone 1 may include signal reception, message reception, a key signal input, and/or the like. The alarm part 153 may output a signal used to notify of the event in different types other than an audio signal or a video signal. For example, vibration may be output.

When the memory part 160 receives a notification message inquiring about execution of another OS different from a currently operated OS based on change of a time or place at which an input signal is input or a user who inputs the input signal, the alarm part 153 may output the alarm to the user in various types.

The power supply part 190 receives external power, internal power, and/or the like under control of the control part 180, and supplies power required for operation of each structural part.

Figure 8:
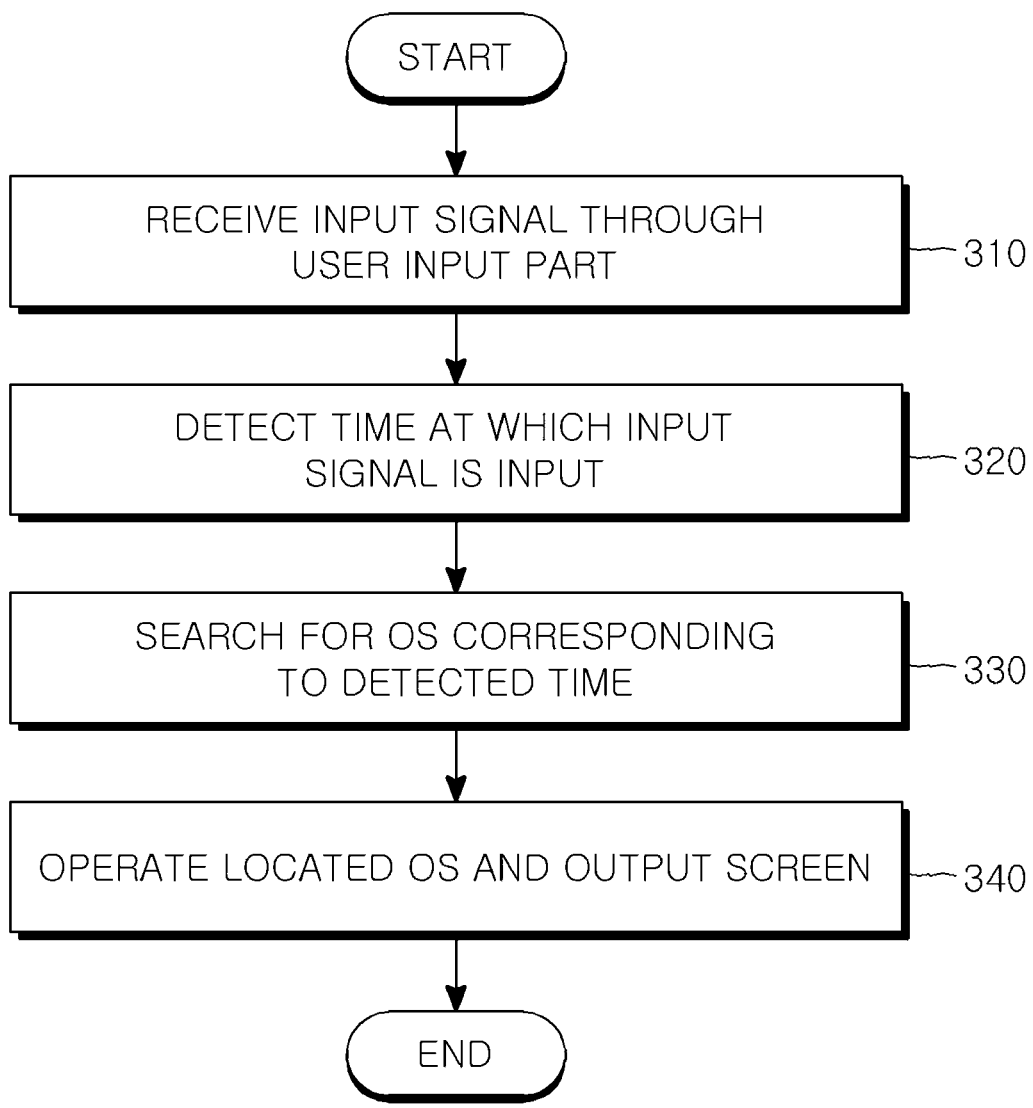
FIG. 8 is a view illustrating a method of controlling a multi smartphone according to an embodiment of the present invention.

Next, referring to FIG. 8, a method of controlling a multi smartphone which searches for and operates OSs according to a time at which an input signal is input will be described.

Firstly, the input signal is received through a user input part 120 (310), and the time at which the input signal is input is detected (320).

Also, the detected time is matched with a plurality of OSs classified in a memory part 160 by time, and an OS corresponding to the detected time is searched for (330).

Meanwhile, the plurality of OSs classified in the memory part 160 by time may be stored in a state in which a driving time is previously determined, and the driving time may be determined by the user.

Also, the located OS is operated on the multi smartphone 1, and a screen displayed under the OS corresponding to the detected time is output (340).

Figure 9:
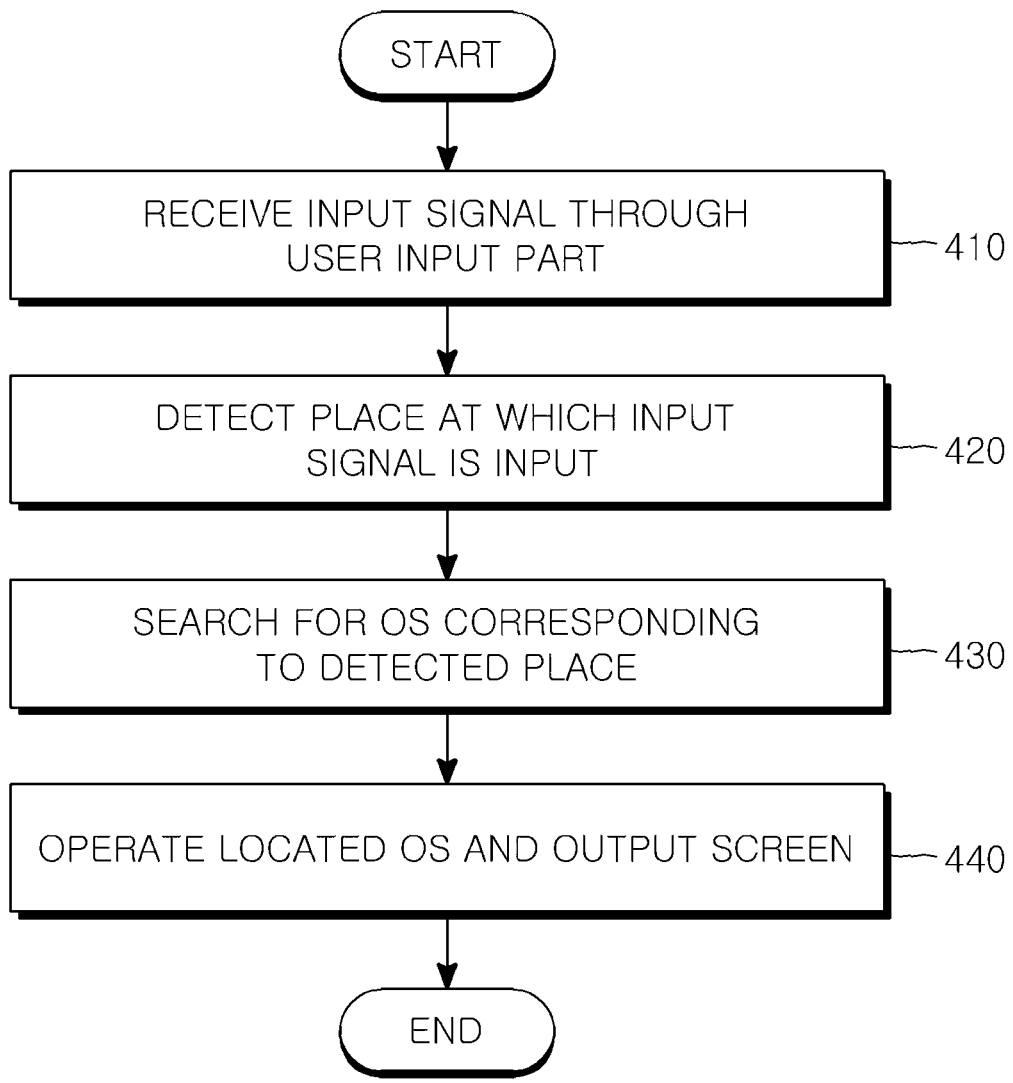
FIG. 9 is a view illustrating a method of controlling a multi smartphone according to an embodiment of the present invention.

Next, referring to FIG. 9, a method of controlling a multi smartphone which searches for and operates OSs according to a place at which an input signal is input will be described.

Firstly, the input signal is received through a user input part (410), and when the input signal is input, the place at which the input signal is input is detected (420).

Also, the detected place is matched with a plurality of OSs classified in a memory part 160 by place, and an OS corresponding to the detected place is searched for (430).

Also, the located OS is operated on the multi smartphone 1, and a screen displayed under the OS corresponding to the detected place is output (440).

Figure 10:
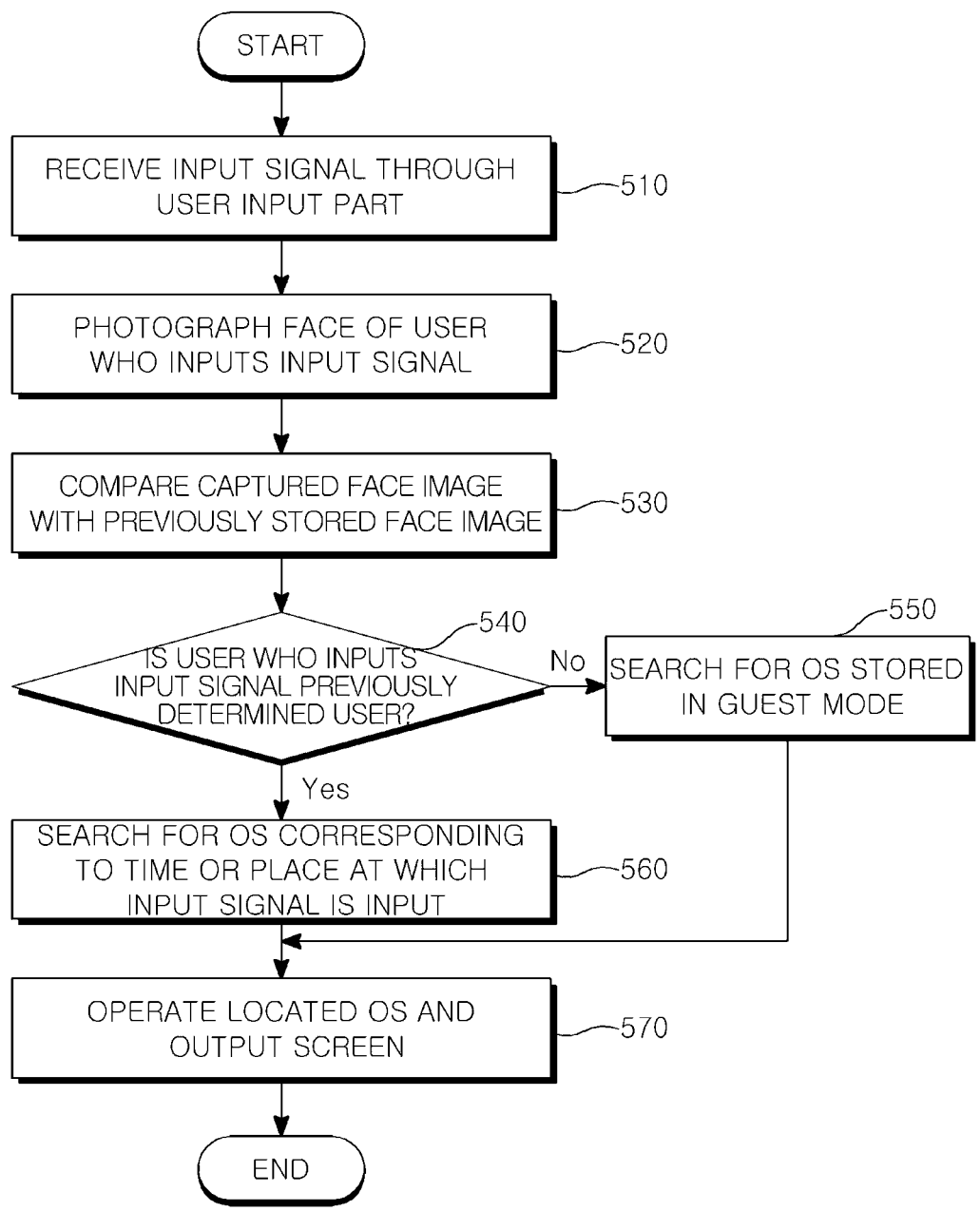
FIG. 10 is a view illustrating a method of controlling a multi smartphone according to an embodiment of the present invention.

Next, referring to FIG. 10, a method of controlling a multi smartphone which searches for and operates OSs in response to a user who inputs an input signal will be described.

Firstly, the input signal is received through a user input part (510), and a face of the user who inputs the input signal is photographed by a camera part 130 (520).

Also, the captured face image is compared with a previously stored face image (530), and it is detected whether the user who inputs the input signal is the previously determined user (540).

Here, when the user who inputs the input signal is not the previously determined user, an OS stored in a guest mode is searched for (550), and when the user who inputs the input signal is the previously determined user, an OS corresponding to the time or place at which the input signal is input is searched for (560).

Also, the located OS is operated on the multi smartphone 1, and a screen is output (570).

Figure 11:
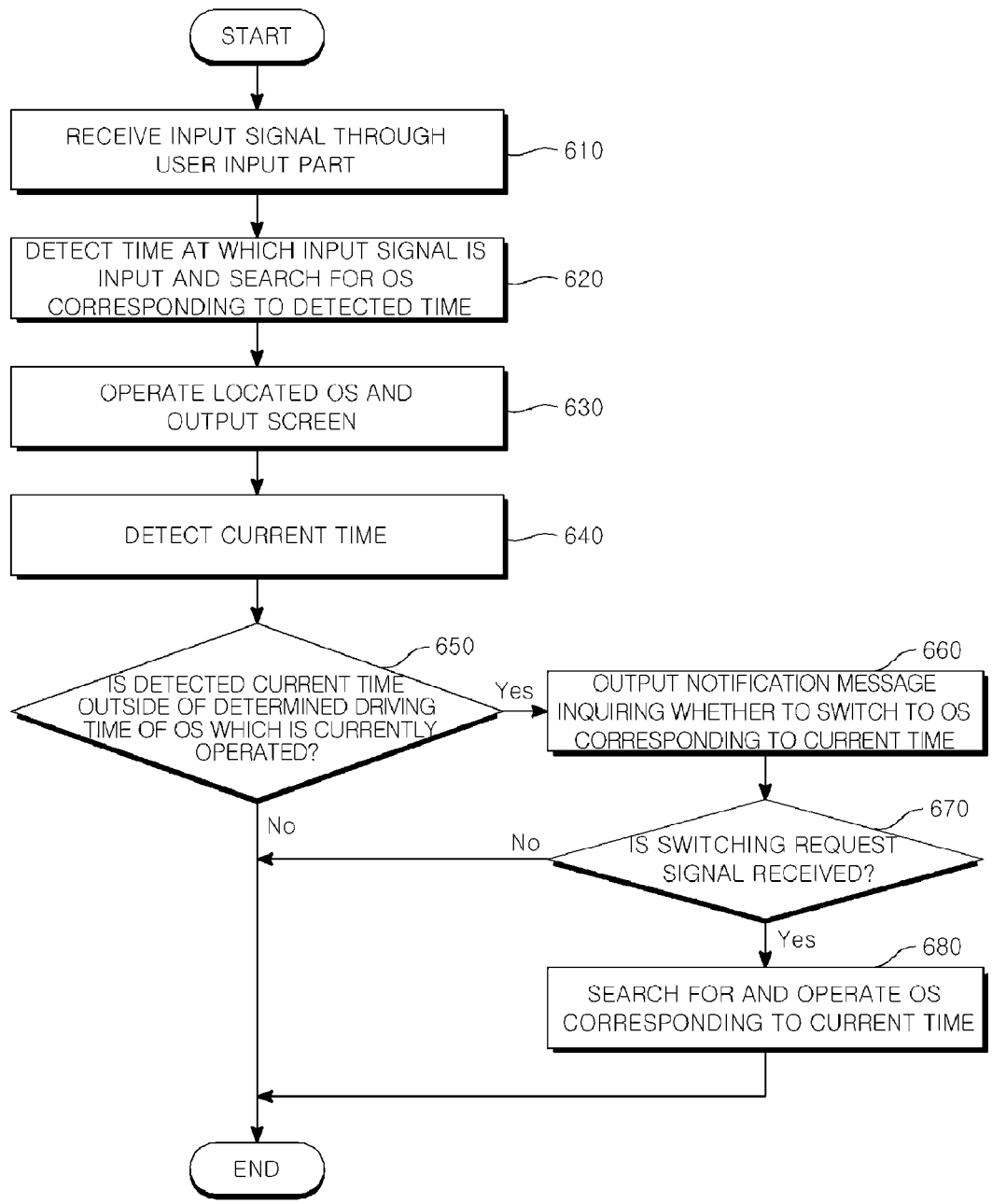
FIG. 11 is a view illustrating a method of controlling a multi smartphone according to another embodiment of the present invention.

Next, referring to FIG. 11, a method of controlling a multi smartphone according to another embodiment of the present will be described.

Firstly, an input signal is received through a user input part 120 (610), a time at which the input signal is input is detected, and an OS corresponding to the detected time is searched for (620).

Also, the located OS is operated, a screen is output (630), and a current time is detected every predetermined period while the screen is output (640).

It is detected whether the detected current time is outside of a previously determined operating time of an OS which is currently operated (650).

Here, when the detected current time is outside of the previously determined operating time of the OS which is currently operated, a notification message inquiring whether to switch to an OS corresponding to the detected current time is output on a display part 151 (660).

Also, when an OS switching request signal is received from the user in response to the output notification message (670), the OS corresponding to the current time is searched for and operated (680).

Figure 12:
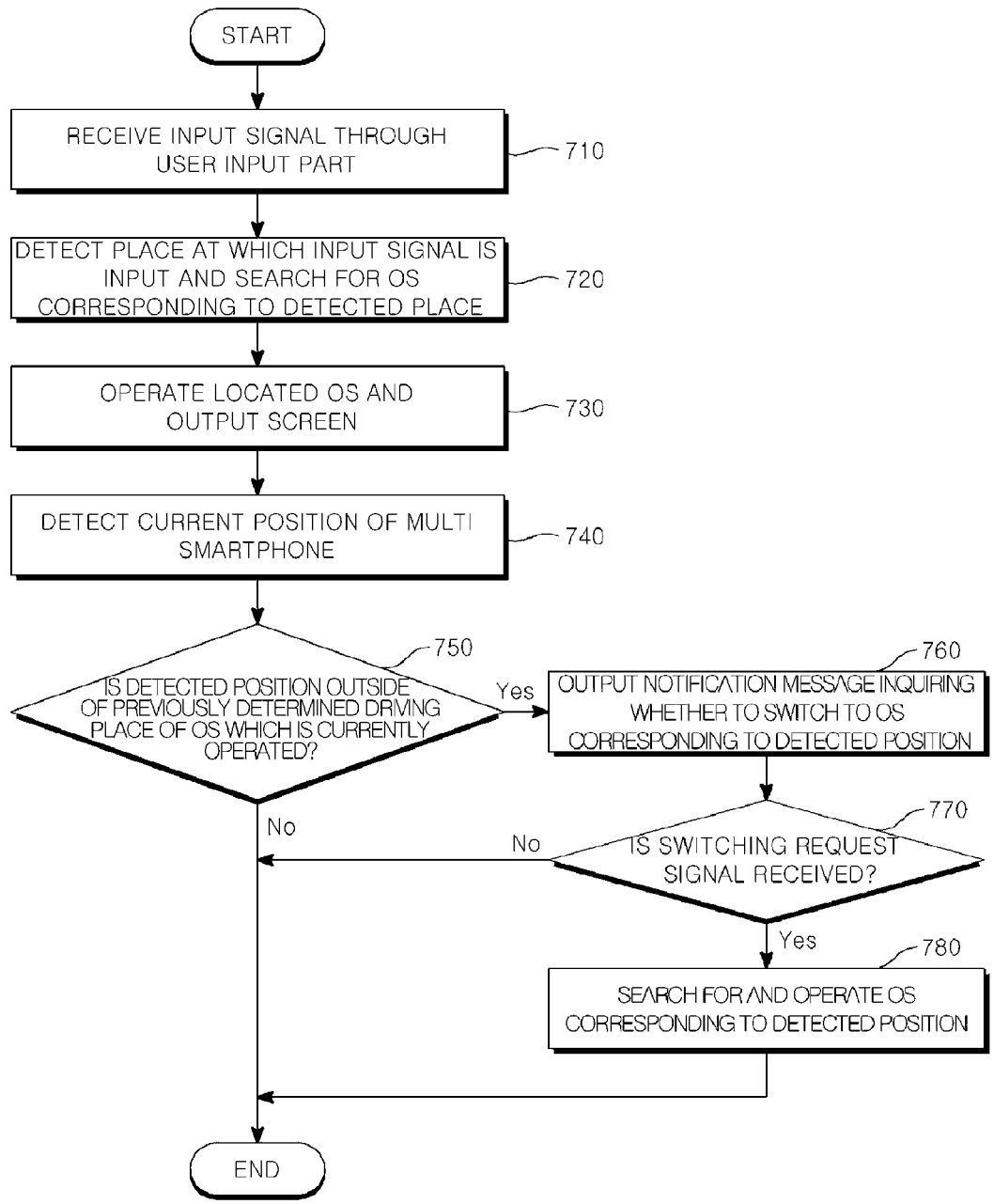
FIG. 12 is a view illustrating a method of controlling a multi smartphone according to another embodiment of the present invention.

Next, referring to FIG. 12, a method of controlling a multi smartphone according to another embodiment of the present invention will be described.

Firstly, an input signal is received through a user input part 120 (710), a location of the multi smartphone 1 is detected, and an OS corresponding to the detected place is searched for (720).

Also, the located OS is operated and a screen is output (730), and a current position of the multi smartphone 1 is detected every predetermined period (740).

Here, the detection of the current position of the multi smartphone 1 may be performed by detecting the current place of the multi smartphone 1 every predetermined period or by searching for a moving path of the multi smartphone 1 to detect the current position.

Also, it is detected whether the detected current position is outside of a previously determined operating place of an OS which is currently operated (750).

Here, when the detected current position is outside of the previously determined operating place of the OS which is currently operated, a notification message inquiring whether to switch to an OS corresponding to the detected current position is output on a display part 151 (760).

Also, when an OS switching request signal is received from the user in response to the output notification message (770), the OS corresponding to the current place is searched for and operated (780).

Figure 13:
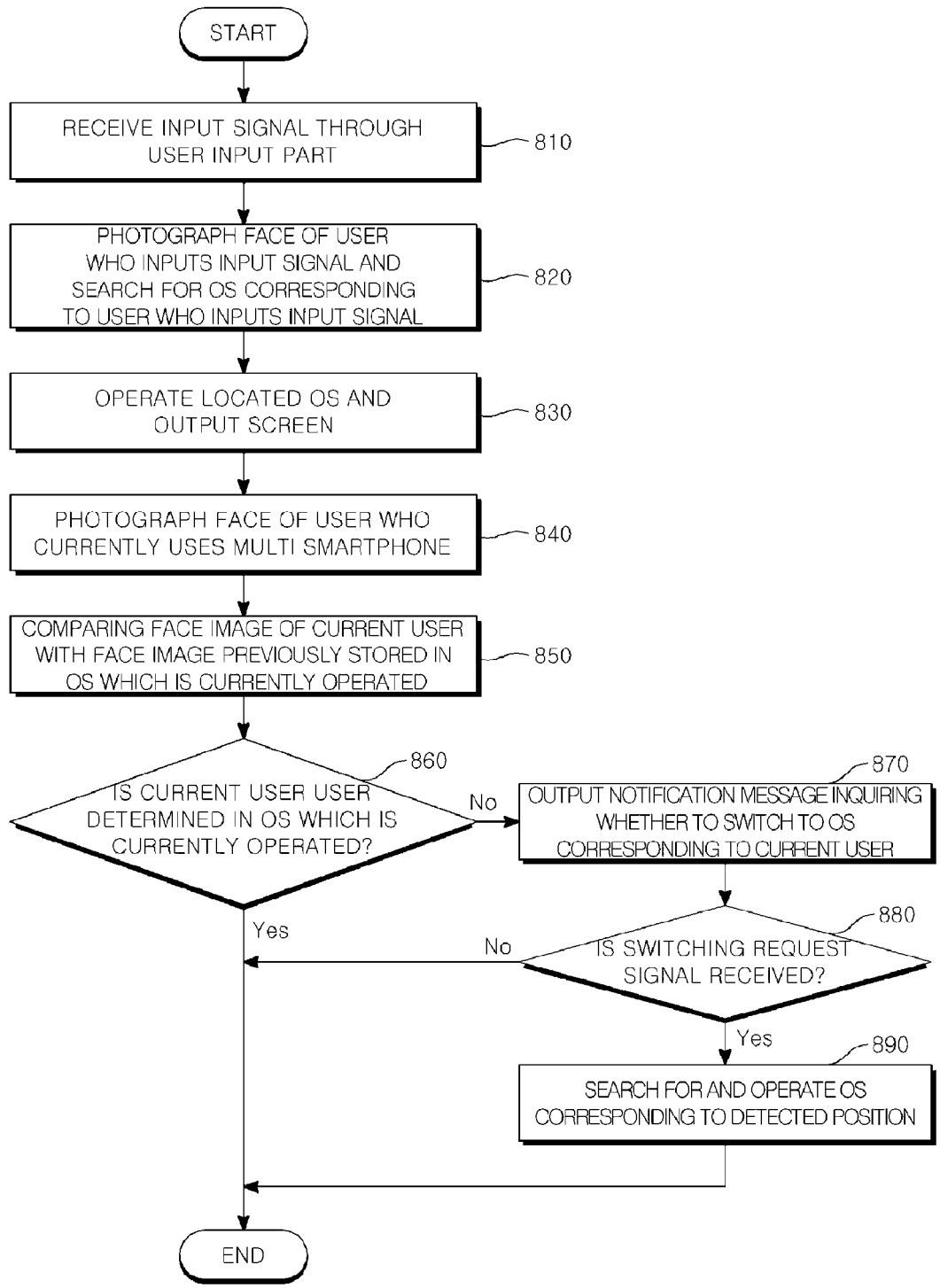
FIG. 13 is a view illustrating a method of controlling a multi smartphone according to another embodiment of the present invention.

Next, referring to FIG. 13, a method of controlling a multi smartphone according to another embodiment of the present invention will be described.

Firstly, an input signal is received through a user input part 120 (810), a face of a user who inputs the input signal is photographed and an OS corresponding to the user who inputs the input signal is searched for (820).

The located OS is operated and a screen is output (830), and the face of the user who currently uses the multi smartphone 1 is photographed every predetermined period during the output of the screen (840).

Also, a face image of the current user is compared with a face image previously stored in the OS which is currently operated (850), and it is detected whether the current user is the user determined in the OS which is currently operated (860).

Here, when the current user is the user determined in the OS which is currently operated, a notification message inquiring whether to switch to an OS corresponding to the current user is output on a display part 151 (870).

Also, when an OS switching request signal is received from the user in response to the output notification message (880), the OS corresponding to the current user is searched for and operated (890).

According to one aspect of the present invention, since one OS is selected and operated based on at least one of a time and place at which an input signal is input, an OS corresponding to a smartphone usage pattern of a user is automatically operated, and a user who is currently using the smartphone is detected, and thus an OS corresponding to the current user may be automatically operated.

According to another aspect of the present invention, while one OS is selected and operated based on at least one of the time and place at which the input signal is input and the user inputting the input signal and at least one of a predetermined time, place, and user changes in the OS being operated, one OS is selected based on at least one of the changed time, place, and user, and thus one OS depending on the time or place at which the smartphone is used or the user using the multi smartphone may be provided in real time.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A mobile device comprising:
   a display assembly having at least one display panel and configured to display an image upon receipt of an input signal;
   a memory assembly configured to store a plurality of operating systems (OSs), wherein each of the plurality of operating systems has a separate configuration to operate in response to all three of a time at which the input signal is input, a place at which the input signal is input, and a face image of a user who inputs the input signal; and
   upon receipt of the input signal, a control assembly configured to command at least one of the plurality of OSs to operate in response to at least one of the time, the place, and the face image based on a selection of the user.

2. The mobile device of claim 1, wherein the control assembly is configured to detect the time at which the input signal is input, to compare the time with a preset database of the plurality of operating systems stored in the memory assembly, and to operate one of the plurality of operating systems in response to the time.

3. The mobile device of claim 2, wherein the preset database of the plurality of operating systems further comprises a preset time configuration which includes a driving time of each of the plurality of operating systems in time order or is configured to be set by the user through a user input assembly.

4. The mobile device of claim 1, wherein the control assembly is configured to detect the place at which the input signal is input, to compare the place with a preset database of the plurality of operating systems stored in the memory assembly, and to operate one of the plurality of operating systems in response to the place.

5. The method of claim 1, wherein the control assembly, during the operation of the first operating system, when at least one of the time, the place, and the face image is changed, switches the first operating system to a second operating system which is one of the plurality of operating systems and is in response to a change of at least one of the time, the place, and the face image.

6. The mobile device of claim 5, wherein the display assembly, when the time is changed, at an end of time period allotted to the first operating system, displays a notification message inquiring whether to switch to another operating system in response to a current time, and wherein the control assembly, upon receipt of a switching request signal from the mobile device in response to the notification message, switches the operating system in response to the current time.

7. The mobile device of claim 5, wherein the display assembly, when the place is changed, displays a notification message inquiring whether to switch to another operating system in response to a current location, and wherein the control assembly, upon receipt of a switching request signal from the mobile device in response to the notification message, switches the operating system in response to the current location.

8. The method of claim 5, wherein the display assembly, when the face image is changed, displays a notification message inquiring whether to switch to another operating system in response to a current face image, and wherein the control assembly, upon receipt of a switching request signal from the mobile device in response to the notification message, switches to the operating system in response to the current face image.

\* \* \* \* \*